(12) United States Patent
Freking et al.

(10) Patent No.: US 7,147,358 B2
(45) Date of Patent: Dec. 12, 2006

(54) COVER REMOVAL TAB FOR OPTICAL PRODUCTS

(75) Inventors: Anthony J. Freking, Vadnais Heights, MN (US); Ashok Lu, Shanghai (CN); John Fei, Shanghai (CN); Ren Hua Feng, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 365 days.

(21) Appl. No.: 10/750,553

(22) Filed: Dec. 31, 2003

(65) Prior Publication Data

US 2005/0146881 A1    Jul. 7, 2005

(51) Int. Cl.
*F21V 5/02* (2006.01)
*B32B 3/00* (2006.01)

(52) U.S. Cl. ............ 362/618; 362/339; 362/620; 428/1.1; 428/172; 156/344

(58) Field of Classification Search ............ 362/330, 362/339, 618, 619, 620; 428/1.1, 172; 156/250, 156/268, 270, 267, 344, 584
See application file for complete search history.

(56) References Cited

U.S. PATENT DOCUMENTS

| | | | |
|---|---|---|---|
| 3,754,813 A | 8/1973 | DePalma | |
| 3,765,281 A | 10/1973 | Wolfe | |
| 3,788,171 A | 1/1974 | Hoadley | |
| 3,851,093 A | 11/1974 | Sunstein | |
| RE29,091 E | 12/1976 | DePalma | |
| 4,542,449 A | 9/1985 | Whitehead | |
| 4,576,850 A * | 3/1986 | Martens | 428/156 |
| 4,791,540 A | 12/1988 | Dreyer, Jr. | |
| 4,804,253 A | 2/1989 | Stewart | |
| 4,906,070 A | 3/1990 | Cobb, Jr. | |
| 4,971,719 A | 11/1990 | Vaz et al. | |
| 4,984,144 A | 1/1991 | Cobb, Jr. et al. | |
| 5,005,108 A | 4/1991 | Pristash | |
| 5,076,668 A | 12/1991 | Dalisa | |
| 5,128,783 A | 7/1992 | Abileah | |
| 5,146,415 A | 9/1992 | Faris | |
| 5,161,041 A | 11/1992 | Abileah | |
| 5,190,370 A | 3/1993 | Miller | |
| 5,247,390 A | 9/1993 | Hed | |
| 5,268,782 A | 12/1993 | Wenz et al. | |

(Continued)

FOREIGN PATENT DOCUMENTS

DE      3407431      8/1985

(Continued)

OTHER PUBLICATIONS

U.S. Appl. No. 10/830,733, Title Optical Products for Displays, Filed Apr. 23, 2004, Nakayama et al., No. of pages, 16 specifications, 3 drawings.

(Continued)

*Primary Examiner*—Stephen Husar
*Assistant Examiner*—Peggy A. Neils
(74) *Attorney, Agent, or Firm*—Stephen W. Buckingham

(57) ABSTRACT

An optical product comprised of an optical film and a protective cover has a cover removal tab attached along one edge. The cover removal tab allows the protective cover to be easily and efficiently removed from the optical film. In addition, there is no imprint of the cover removal tab on the optical film when multiple optical products are stacked or rolled up for storage, the protective cover remains the same size as the optical film, adding the cover removal tab to the optical product only requires a one punch-head converting machine, and there is minimal waste of material and time to add the cover removal tab.

23 Claims, 4 Drawing Sheets

U.S. PATENT DOCUMENTS

| | | | |
|---|---|---|---|
| 5,280,371 A | 1/1994 | McCartney, Jr. |
| 5,394,255 A | 2/1995 | Yokota |
| 5,435,963 A | 7/1995 | Rackovan et al. |
| 5,467,208 A | 11/1995 | Kokawa |
| 5,492,590 A | 2/1996 | Sakai et al. |
| 5,521,797 A | 5/1996 | Kashima |
| 5,550,657 A | 8/1996 | Tanaka |
| 5,552,907 A | 9/1996 | Yokota |
| 5,592,332 A | 1/1997 | Nishio |
| 5,596,429 A | 1/1997 | Kokawa |
| 5,598,280 A | 1/1997 | Nishio |
| 5,600,455 A | 2/1997 | Ishikawa |
| 5,600,462 A | 2/1997 | Suzuki |
| 5,627,926 A | 5/1997 | Nakamura |
| 5,659,408 A | 8/1997 | Wenyon |
| 5,767,931 A | 6/1998 | Paczkowski |
| 5,771,328 A | 6/1998 | Wortman |
| 5,828,488 A | 10/1998 | Ouderkirk et al. |
| 5,919,551 A | 7/1999 | Cobb, Jr. |
| 5,997,964 A | 12/1999 | Klima, Jr. |
| 6,052,164 A | 4/2000 | Cobb, Jr. |
| 6,079,840 A | 6/2000 | Ono et al. |
| 6,104,854 A | 8/2000 | Masaki |
| 6,185,043 B1 | 2/2001 | Imamura |
| 6,191,833 B1 | 2/2001 | Hirakata |
| 6,322,236 B1 | 11/2001 | Campbell |
| 6,364,497 B1 | 4/2002 | Park et al. |
| 6,411,353 B1 | 6/2002 | Yarita et al. |
| 6,462,794 B1 | 10/2002 | Yoshikawa et al. |
| 6,538,709 B1 | 3/2003 | Kurihara |
| RE38,243 E | 9/2003 | Oe et al. |
| 6,613,421 B1 | 9/2003 | Jonza et al. |
| 6,661,482 B1 | 12/2003 | Hara |
| 6,661,487 B1 | 12/2003 | Takahashi et al. |
| 6,685,795 B1 * | 2/2004 | Braun ................ 156/344 |
| 2002/0080598 A1 | 6/2002 | Parker et al. |
| 2002/0124950 A1 | 9/2002 | Klima |
| 2002/0196397 A1 | 12/2002 | Sugiura |
| 2003/0063251 A1 | 4/2003 | Murata et al. |
| 2003/0133207 A1 | 7/2003 | Minami et al. |
| 2004/0141103 A1 | 7/2004 | Kotchick |
| 2005/0046767 A1 | 3/2005 | Freking et al. |

FOREIGN PATENT DOCUMENTS

| | | |
|---|---|---|
| EP | 0395957 | 11/1990 |
| EP | 0 531 939 | 3/1993 |
| EP | 0 770 899 | 5/1997 |
| EP | 1134068 | 9/2001 |
| EP | 1168282 A | 1/2002 |
| EP | 1220014 | 7/2002 |
| EP | 1302922 | 4/2003 |
| JP | 6-18707 | 1/1994 |
| JP | HEI-6-342106 | 12/1994 |
| JP | 07-078254 | 3/1995 |
| JP | 09-267424 | 10/1997 |
| JP | 11259021 | 9/1999 |
| JP | 2001301104 A | 10/2001 |
| JP | 2002304254 A | 10/2002 |
| JP | 2003-207767 | 7/2003 |
| WO | WO 96/27757 | 9/1996 |
| WO | WO 97/28468 | 8/1997 |
| WO | WO 0150160 | 7/2001 |
| WO | WO 0221167 A | 3/2002 |
| WO | WO 03010569 | 2/2003 |
| WO | WO 03/042747 | 5/2003 |

OTHER PUBLICATIONS

U.S. Appl. No. 11/036,521, Title: Pre-Stacked Optical Films, Filed Jan. 14, 2005, Freking et al., No. of pages: 13 specifications, 8 drawings.

US 2001/0013282, 08/2001, LaBelle et al. (withdrawn)

* cited by examiner

COVER REMOVAL TAB FOR OPTICAL PRODUCTS

BACKGROUND OF THE INVENTION

The present invention relates to optical films. In particular, the present invention relates to a tab, which allows easy removal of protective coverings from optical films and a method of forming the tab.

Optical films are used to increase the amount of light exiting an optical display in a preferred direction, typically this is a direction normal, or "on-axis," to the surface of the display. Increasing the amount of on-axis light reduces the amount of energy required to generate a desired amount of on-axis luminance. This is particularly important for optical displays that use battery powered light sources such as those used in laptop computers, calculators, digital wristwatches, cellular phones, and personal digital assistants.

The 3M brand Brightness Enhancement Film from 3M Company, the assignee of the present invention, is used to address this problem. The film collects light from "off-axis" and redirects or "recycles" this light on-axis toward the viewer. In use, this material increases the on-axis luminance at the expense of off-axis luminance.

A "turning" film is also used to increase the amount of on-axis light exiting a display. Turning films are usually used in combination with wedge-shaped or stepped-wedge light guides. Light rays exiting the light guide at the glancing angle, usually less than 30° to the output surface, are internally reflected such that they are directed substantially on-axis. Representative embodiments of turning films are described in U.S. Pat. Nos. RE38,243 E and 4,984,144, which are assigned to 3M Company.

Another film used to increase on-axis light exiting a display is a reflective polarizer, these include multilayer optical films such as DBEF from 3M Company. The film is formed of layers of polymer that provides high polarized reflectivity over a wide bandwidth. Representative embodiments are described in U.S. Pat. No. 6,613,421, which is assigned to 3M Company.

Other examples of useful optical films manufactured by 3M Company are described in U.S. Pat. Nos. 5,828,488 and 4,906,070. These include films that are combinations of or variations of the films discussed above.

The films described above need to be protected. To prevent scratching or other damage prior to assembly in an optical display, a protective cover, or pre-mask, is laminated to the film.

Current products that include a film/pre-mask combination are manufactured by first laminating a sheet of pre-mask to a sheet of film and subsequently cutting the sheet of film/pre-mask with a single die to form the products. Because the pre-mask is the exact size of the film, and the edges of the film and the pre-mask are exactly aligned, removing the pre-mask during assembly of the display is difficult and time consuming.

BRIEF SUMMARY OF THE INVENTION

The present invention is an optical product with a cover removal tab and a method of making the product. A web, comprised of a protective cover sheet and an optical film sheet, is cut to form the optical product with the cover removal tab. Another cut is through essentially only the optical film to divide the optical film and the cover removal tab so that the cover removal tab remains connected to the optical product by the protective cover.

DESCRIPTION

The present invention is described in terms of light directing films such as the 3M brand Brightness Enhancement Film, which has prism elements with apex angles of about 90°. However, those skilled in the art know that it can be used with any optical films for use in optical displays. These include, for example, turning films, reflective polarizers including multilayer optical films, etc., as discussed previously.

Figure 1:
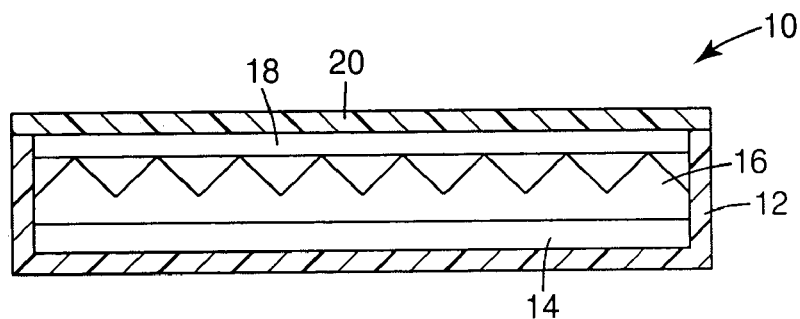
FIG. 1 is a cross-sectional view of an optical display.

FIG. 1 shows an optical display 10, which includes case 12, light source 14, light directing film 16, light gating device 18, and cover sheet 20. It can be seen that light directing film 16 has a structured surface containing prism elements, which may be any of a variety of sizes and forms. Here, the size of the structured surface, in particular, is greatly exaggerated for illustrative purposes. Sharp-tipped prism elements, such as shown here, are fragile and must be protected prior to assembly into optical display 10. Thus, a protective cover, or pre-mask, must be applied to light directing film 16 and subsequently removed for installation. The following is a description of a light directing product, which includes a protective cover laminated to a light directing film, as it comes to a manufacturer for assembly into an optical device and the method of making the product.

Figure 2:
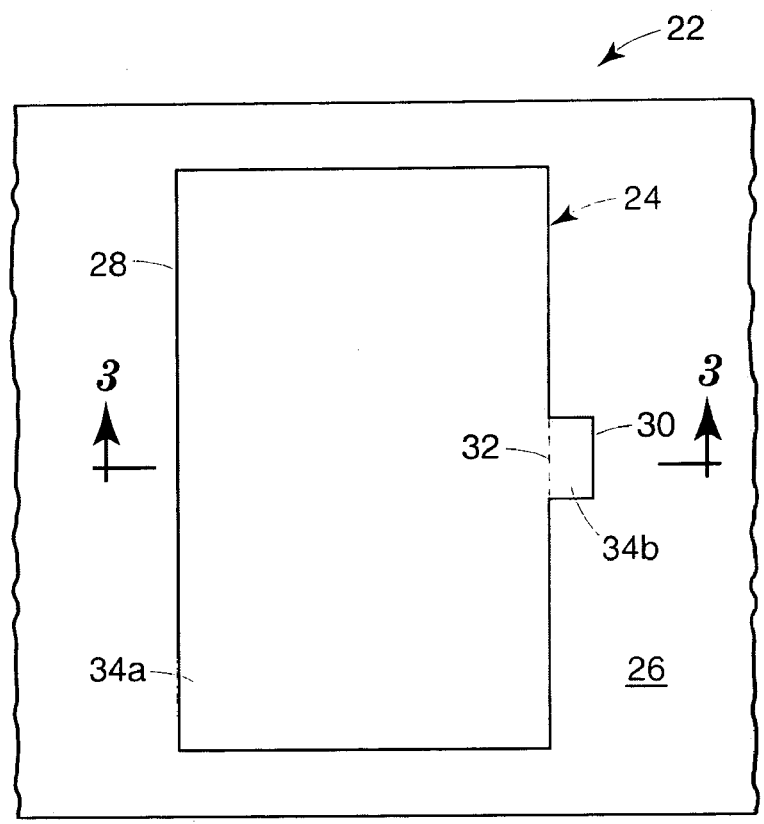
FIG. 2 is a top view of a representative embodiment of a light directing film for use in a display in accordance with the present invention.
Figure 3:
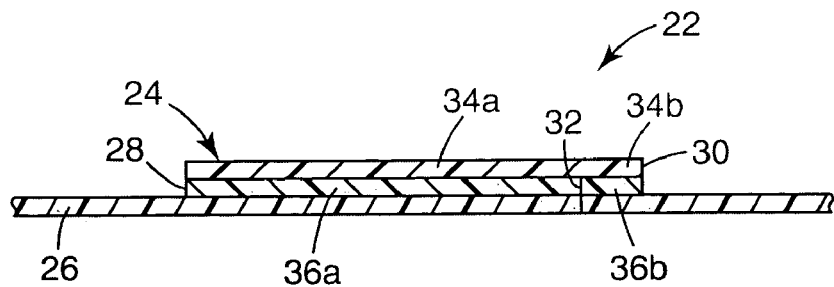
FIG. 3 is a cross-sectional view of a representative embodiment of a light directing film for use in a display in accordance with the present invention.

FIGS. 2 and 3 are top and cross-sectional side views, respectively, of a representative embodiment of the present invention. FIGS. 2 and 3 show a light directing film for use in displays 22, which includes light directing product with cover removal tab (tabbed product) 24 and liner 26 (shown cut away). Tabbed product 24 further includes light directing product 28; tab 30; cut 32, which divides light directing product 28 and tab 30; and protective covers 34a and 34b. FIG. 3, which is a cross-section along section 3—3 of FIG. 2, further shows that tabbed product 24 includes two layers, protective covers 34a and 34b and light directing films 36a and 36b. The perimeters, or edges, of protective covers 34a and 34b and light directing films 36a and 36b are the same shape and size so that when stacked the edges are aligned. Tab 30 may be attached essentially anywhere along the perimeter of light directing product 28.

Tabbed product 24 is manufactured on liner 26 and remains adhered to liner 26 until light directing film 36a is assembled into an optical display. At this time, tabbed product 24 is detached from liner 26. Typically, about 15 tabbed products 24 are adhered to a section of liner 26, and when all of them are detached, liner 26 can be discarded.

Figure 4:
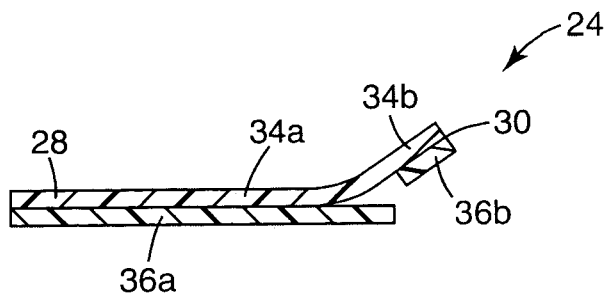
FIG. 4 is a cross-sectional view of a light directing product in accordance with the present invention.

FIG. 4 shows tabbed product 24 in use. To assemble light directing film 36a into an optical display, protective covers 34a and 34b and light directing film 36b must be removed from light directing film 36a. Tab 30, which includes protective cover 34b and light directing film 36b, is pulled in a manner that peels protective cover 34a from light directing film 36a. Light directing film 36a is now ready for installation. Alternatively, tabbed product 24 is placed in the display prior to removing tab 30 and protective cover 34a from light directing film 36a.

Figure 5A:
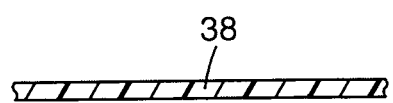
FIGS. 5a–5f are cross-sectional views illustrating a method of making a light directing film for use in a display in accordance with the present invention.
Figure 5B:
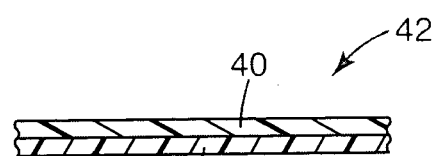
Figure 5C:
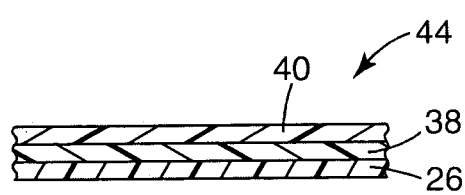
Figure 5D:
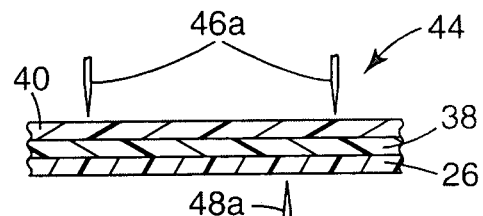
Figure 5E:
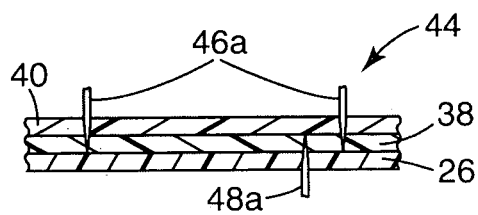
Figure 5F:
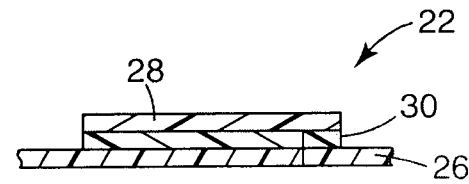

FIGS. 5a–5f illustrate one method of making a light directing film for use in a display 22. FIG. 5a shows light directing film sheet 38, which contains prism elements that can be made by any one of a variety of known techniques. In FIG. 5b, protective cover sheet 40 is laminated onto the structured surface of light directing film sheet 38 (see FIG. 1) to form web 42. Next, web 42 is adhered to liner 26 forming web/liner 44 as shown in FIG. 5c. It should be noted that the layering of sheets 38 and 40 and liner 26 to form web/liner 44 can be performed in any order or done simultaneously. FIG. 5d shows the positions of blade 46a of upper die 46 and blade 48a of lower die 48 relative to web/liner 44. Upper and lower dies 46 and 48, described in more detail below, cut web/liner 44 to form tabbed product 24. In FIG. 5e, blade 46a is shown cutting down through web 42, and blade 48a is shown cutting up through liner 26 and light directing film sheet 38, although these cuts do not necessarily happen concurrently on a single tabbed product 24. After the waste material is stripped away, FIG. 5f shows the resulting light directing film for use in displays 22.

Figure 6:
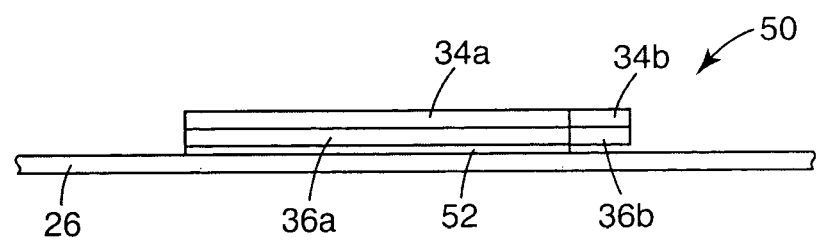
FIG. 6 is a representative alternate embodiment of a light directing film for use in a display in accordance with the present invention.

Other layers may be added depending on the application and type of the film. FIG. 6 illustrates a representative embodiment of a light directing film for use in a display with a transfer tape 50. Transfer tape 52 is adhered along the edges of light directing film 36a opposite the structured surface, which is laminated to protective cover 34a. Transfer tape 52 is used to mount film 36a on the back of a light guide in an optical display.

Figure 7:
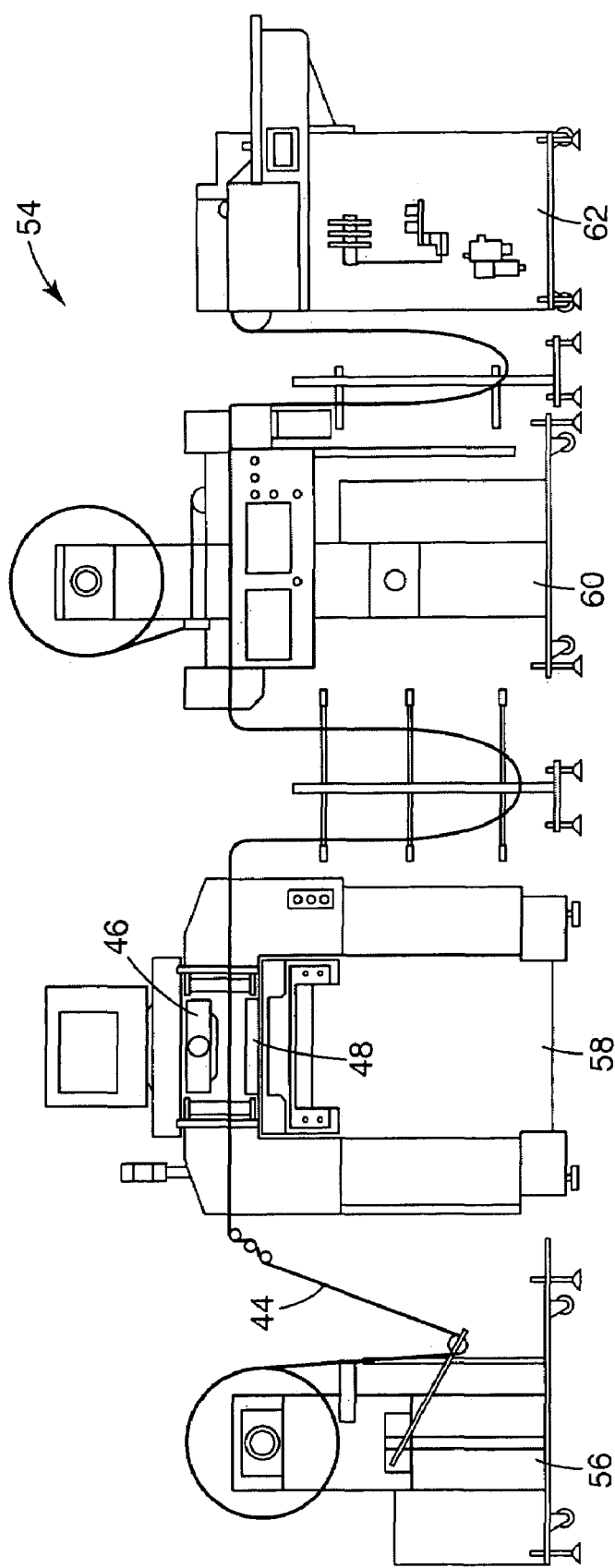
FIG. 7 is a front view of a converting machine.

FIG. 7 shows a converting machine 54 that can be used with the present invention. FIG. 7 includes converting machine 54 and web/liner 44. Converting machine 54 comprises unwinder 56, stamping press 58 with upper die 46 and lower die 48, stripper 60, and sheet cutter 62.

In operation, rolls of web/liner 44 are unwound by unwinder 56 and fed through stamping press 58. Upper die 46 of stamping press 58 vertically reciprocates, while lower die 48 of stamping press 58 is stationary. Upper die 46 and lower die 48 cut web/liner 44 to form tabbed product 24. Web/liner 44 is then fed into stripper 60 where waste web 42 surrounding tabbed products 24 is stripped away. Web/liner 44 is subsequently fed through sheet cutter 62 where liner 26 is cut into sections that carry one or more of tabbed products 24.

Figure 8:
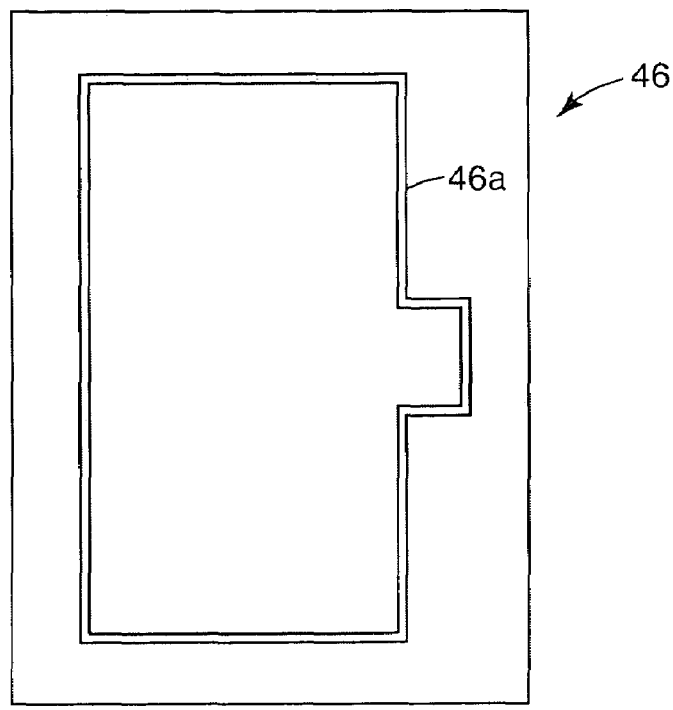
FIG. 8 is a top view of an upper die.

FIG. 8 is an illustration of upper die 46 with blade 46a. As shown, blade 46a has the overall shape of tabbed product 24. Upper die 46 reciprocates vertically to cut, or punch, out tabbed product 24 from web 42.

Figure 9:
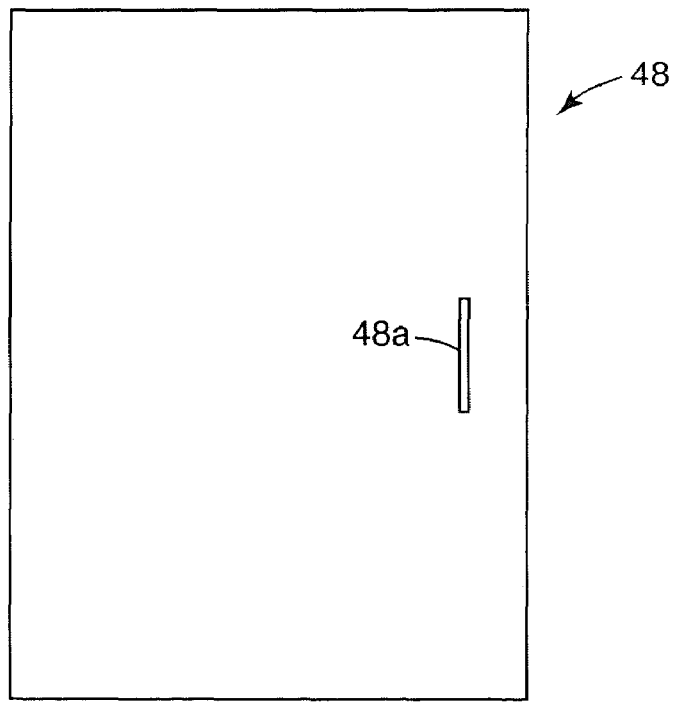
FIG. 9 is a top view of a lower die.

FIG. 9 is an illustration of lower die 48 with blade 48a. Blade 48a is shaped to cut or sever at cut 32. In operation, lower die 48 is stationary and cuts through liner 26 to sever light directing film 36a from light directing film 36b (FIGS. 2 and 3).

Preferably, dies 46 and 48 cut concurrently, but more specifically by progressive cutting. During one stroke of stamping press 58, die 48 performs its cut for one tabbed product 24. At the same time, die 46 performs its cut for a second tabbed product 24 that is actually positioned ahead of the first tabbed product 24 and was previously cut by die 48. The cuts could alternatively be performed by sequential strokes, however, progressive cutting is the simplest and most efficient means of cutting.

Although the present invention has been discussed using a stamping process to form the cover removal tab for light directing products, it is well within the scope of this invention to use any means of converting a tab on light directing products. For example, a rotary converting process may also be used to form the cover removal tab.

The present invention has several advantages. First, there is no imprint of tab 30 transferred to light directing film 36a when tabbed products 24 are stacked or rolled-up for storage. Second, protective covers 34a and 34b are not larger than light directing films 36a and 36b, because having protective covers 34a and 34b larger than light directing films 36a and 36b is unacceptable to some users. Third, the method of making tabbed product 24 only requires a one punch-head converting machine. Fourth, there is minimal waste of material and time to add tab 30. Fifth, the addition of tab 30 to light directing product 28 provides a way to easily remove a protective cover from a light directing film.

The invention claimed is:

1. A method of making an optical product, the method comprising:
   providing an optical film sheet having a first surface and a second surface, the first surface having an array of prism elements;
   laminating a protective cover sheet to the first surface of the optical film sheet to form a web;
   cutting the web to form the optical product, comprised of an optical film and a protective cover, with a cover removal tab; and
   cutting essentially only the optical film sheet of the web between the optical product and the cover removal tab so that the cover removal tab remains connected to the optical product by the protective cover.

2. The method of claim 1 and further comprising:
   laminating a transfer tape to the second surface of the optical film sheet; and
   wherein the transfer tape is cut concurrently with the web.

3. The method of claim 1 wherein the web is carried by a liner that is cut concurrently with essentially only the optical film sheet of the web.

4. The method of claim 1 wherein the optical film is a turning film.

5. The method of claim 1 wherein the optical film is a multilayer optical film.

6. The method of claim 1 wherein the optical film is a light directing film.

7. A method of making an optical product, the method comprising:
   cutting essentially only an optical film sheet of a web comprised of the optical film sheet and a protective cover sheet with a first die shaped to divide an optical film and a removal tab; and
   cutting the web with a second die having a shape of the optical film with the removal tab.

8. The method of claim 7 wherein the first die and the second die cut in opposite directions.

9. The method of claim 7 and further comprising:
   attaching the web to a liner.

10. A method of making an optical product, the method comprising:
- laminating a protective cover sheet to an optical film sheet to form a web;
- severing the web to form the optical product, comprised of a protective cover and an optical film, with a removal tab; and
- severing, between the optical product and the removal tab, the optical film so that the removal tab remains connected to the optical product by the protective cover.

11. The method of claim 10 wherein removing the removal tab from the optical product also removes the protective cover from the optical film.

12. The method of claim 10 wherein the optical film is a light directing film having prism elements that have apex angles of about 90°.

13. The method of claim 10 wherein the optical film is a turning film.

14. The method of claim 10 wherein the optical film is a multilayer optical film.

15. An optical product with a removal tab comprising:
- a protective cover stacked on an optical film, the protective cover being continuous between the optical product and the removal tab, the optical film being discontinuous between the optical product and the removal tab such that the removal tab is connected to the optical product by the protective cover.

16. The optical product with a removal tab of claim 15 and further comprising:
- a transfer tape stacked underneath the optical film.

17. The optical product with a removal tab of claim 15 wherein the protective cover and the optical film have perimeters of equal size and shape, the perimeters being aligned.

18. The optical product with a removal tab of claim 15 wherein the optical film is a light directing film with prism elements having apex angles of about 90°.

19. The optical product with a removal tab of claim 15 wherein the optical film is a turning film.

20. The optical product with a removal tab of claim 15 wherein the optical film is a multilayer optical film.

21. An optical product with a removal tab comprising:
- an optical product comprised of a layer of protective cover stacked on a layer of optical film, the layers having aligned edges;
- a tab comprised of the layers and attached to an edge of the product such that the layer of protective cover is continuous between the product and the tab; and
- a cut in the layer of optical film, the cut dividing the product and the tab such that the optical film is discontinuous between the product and the tab.

22. The optical product with a removal tab of claim 21 wherein the optical product is shaped for use in an optical display.

23. The optical product with a removal tab of claim 21 wherein the tab and the layer of protective cover of the optical product are removable from the layer of optical film of the product.

* * * * *